United States Patent
Mäkelä et al.

(10) Patent No.: US 12,269,996 B2
(45) Date of Patent: Apr. 8, 2025

(54) METHOD FOR PRODUCING RENEWABLE C3 HYDROCARBONS AND RENEWABLE AROMATIC HYDROCARBONS

(71) Applicant: Neste Oyj, Espoo (FI)

(72) Inventors: Eveliina Mäkelä, Porvoo (FI); Marja Tiitta, Porvoo (FI); Marja-Liisa Kärkkäinen, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 18/724,153

(22) PCT Filed: Nov. 21, 2022

(86) PCT No.: PCT/FI2022/050765
§ 371 (c)(1),
(2) Date: Jun. 25, 2024

(87) PCT Pub. No.: WO2023/126561
PCT Pub. Date: Jul. 6, 2023

(65) Prior Publication Data
US 2025/0011658 A1    Jan. 9, 2025

(30) Foreign Application Priority Data
Dec. 27, 2021 (FI) .................................... 20216355

(51) Int. Cl.
*C10G 11/05*    (2006.01)
*B01J 29/06*    (2006.01)
(Continued)

(52) U.S. Cl.
CPC ............... *C10G 3/44* (2013.01); *B01J 29/06* (2013.01); *B01J 35/615* (2024.01); *C10G 3/50* (2013.01);
(Continued)

(58) Field of Classification Search
None
See application file for complete search history.

(56) References Cited

U.S. PATENT DOCUMENTS

| | | |
|---|---|---|
| 2009/0270245 A1 | 10/2009 | Kumar et al. |
| 2009/0283442 A1 | 11/2009 | Mccall et al. |

(Continued)

FOREIGN PATENT DOCUMENTS

| | | |
|---|---|---|
| CN | 109336130 A | 2/2019 |
| EP | 1741768 A1 | 1/2007 |

(Continued)

OTHER PUBLICATIONS

International Search Report for PCT/FI2022/050765, mailed Feb. 8, 2023, 3 pages.
(Continued)

*Primary Examiner* — Tam M Nguyen
(74) *Attorney, Agent, or Firm* — Joshua B. Brady; Nixon & Vanderhye, P.C.

(57) ABSTRACT

The present invention relates to a method for producing renewable C3 hydrocarbons D and renewable aromatic hydrocarbons E from a renewable feedstock A, in particular to methods comprising hydrodeoxygenation (20) and catalytic cracking (40) steps wherein the catalytic cracking is catalysed by a catalyst comprising a zeolite and a support, wherein the zeolite is a 12-membered ring zeolite with a pore size below 0.7 nm.

21 Claims, 1 Drawing Sheet

(51) Int. Cl.
  *B01J 35/61* (2024.01)
  *C10G 3/00* (2006.01)
  *C10G 11/20* (2006.01)
  *C10G 65/12* (2006.01)

(52) U.S. Cl.
  CPC .............. *C10G 11/05* (2013.01); *C10G 11/20* (2013.01); *C10G 65/12* (2013.01); *C10G 2300/1007* (2013.01); *C10G 2300/1011* (2013.01); *C10G 2300/4006* (2013.01); *C10G 2300/4012* (2013.01); *C10G 2400/28* (2013.01); *C10G 2400/30* (2013.01)

(56) References Cited

U.S. PATENT DOCUMENTS

| | | |
|---|---|---|
| 2009/0287029 A1 | 11/2009 | Anumakonda et al. |
| 2011/0015459 A1 | 1/2011 | Aalto et al. |
| 2012/0022305 A1 | 1/2012 | Yao et al. |
| 2013/0310620 A1 | 11/2013 | Kalnes |
| 2014/0115952 A1 | 5/2014 | Wang |
| 2014/0274664 A1 | 9/2014 | Weigel et al. |
| 2014/0275689 A1 | 9/2014 | Petrovic et al. |
| 2014/0335586 A1 | 11/2014 | Zhang |
| 2015/0203417 A1 | 7/2015 | Tian et al. |
| 2015/0307786 A1* | 10/2015 | Dayton ............... B01J 23/24 502/313 |
| 2019/0136142 A1 | 5/2019 | Chang et al. |
| 2021/0087480 A1 | 3/2021 | Abhari et al. |
| 2021/0198584 A1* | 7/2021 | Vermeiren ............ C10G 47/00 |
| 2021/0207041 A1* | 7/2021 | Vermeiren ............ C10G 45/08 |
| 2023/0357648 A1* | 11/2023 | Slade .................. C10G 7/00 |
| 2023/0407191 A1* | 12/2023 | Xu ..................... C10G 65/043 |

FOREIGN PATENT DOCUMENTS

| | | |
|---|---|---|
| EP | 2325281 A1 | 5/2011 |
| EP | 2253608 B2 | 6/2021 |
| EP | 1830956 B1 | 11/2022 |
| FI | 119801 B | 3/2009 |
| WO | 2006070073 A1 | 7/2006 |
| WO | 2009130392 A1 | 10/2009 |
| WO | WO 2009144411 A2 | 12/2009 |
| WO | WO 2009151692 A2 | 12/2009 |
| WO | WO 2015181744 A1 | 12/2015 |
| WO | 2020016405 A1 | 1/2020 |
| WO | 2020016410 A1 | 1/2020 |
| WO | 2021119610 A1 | 6/2021 |

OTHER PUBLICATIONS

Written Opinion for PCT/FI2022/050765, mailed Feb. 8, 2023, 5 pages.
International Preliminary Report on Patentability w/Annex for PCT/FI2022/050765, dated Feb. 7, 2024, 38 pages.
Finnish Search Report for FI 20216355, dated Mar. 11, 2022, 2 pages.
Feng Cheng et al., "Producing jet fuel from biomass lignin: Potential pathways to alkyl-benzenes and cycloalkanes", Renewable and Sustainable Energy Reviews, vol. 72, Jan. 21, 2017, pp. 673-722.
Ivo Dijs et al., "Quantitative Determination By 14C Analysis of the Biological Component in Fuels", Radiocarbon, vol. 48, No. 3, 2006, pp. 315-323.
International Search Report for PCT/FI2022/050769, mailed Feb. 20, 2023, 3 pages.
Written Opinion of the ISA for PCT/FI2022/050769, mailed Feb. 20, 2023, 3.
Jia et al., "Modern synthesis strategies for hierarchical zeolites: Bottom-up versus top-down strategies", Advanced Powder Technology 30 (2019) pp. 467-484.
International Search Report for PCT/FI2022/050767, mailed Feb. 13, 2023, 3 pages.
Written Opinion of the ISA for PCT/FI2022/050767 mailed Feb. 13, 2023, 5 pages.
International Preliminary Report on Patentability for PCT/FI2022/050767 mailed Apr. 17, 2024, 12 pages.
Gao et al., "Hydrocracking diversity in n-dodecane isomerization on Pt/ ZSM-22 and Pt/ZSM-23 catalysts and their catalytic performance for hydrodewaxing of lube base oil", Petroleum Science, 2020 (doi: 10.1007/s12182-020-00500-7), 12 pages.
Zhai M, Li L, Ba Y, Zhu K, Zhou X, Fabricating ZSM-23 with Reduced Aspect Ratio Through Ball-Milling and Recrystallization: Synthesis, Structure and Catalytic Performance in N-heptane Hydroisomerization, Catalysis Today 329 (2019) pp. 82-93.
Technical Data Sheet: ACS Material ZSM-23. [online], Nov. 9, 2018, [retrieved Mar. 10, 2022] from https://www.acsmaterical.com/zsm-23.html , whole document.
Search Report for FI20216359, dated Mar. 23, 2022, 2 pages.
International Preliminary Report on Patentability for PCT/FI2022/050769, completed Apr. 2, 2024, 10 pages.
Machine Translation of WO 2009144411 A2 (Year: 2009).
International Search Report for PCT/FI2022/050768, mailed Feb. 17, 2023, 3 pages.
Written Opinion of the ISA for PCT/FI2022/050768 mailed Feb. 17, 2023, 5 pages.
International Preliminary Report on Patentability for PCT/FI2022/050768, dated Apr. 5, 2024, 8 pages.
Finnish Search Report for FI 20216358, dated Mar. 14, 2022, 2 pages.
Parmar S. et al., "Hydroisomerization of n-hexadecane over Brønsted acid site tailored Pt/ZSM-12", Journal of Porous Materials Springer, US, New York, vol. 21, Aug. 9, 2014, 9 pages.
Finnish Search Report for FI 20216357, dated Mar. 25, 2022, 2 pages.
Kloetstra K. R. et al., "Overgrowth of Mesoporous MCM-41 on Faujasite", Microporous Materials, Elsevier Science BV, Amsterdam, NL, vol. 6, No. 5/06, 1996, pp. 287-293.

* cited by examiner

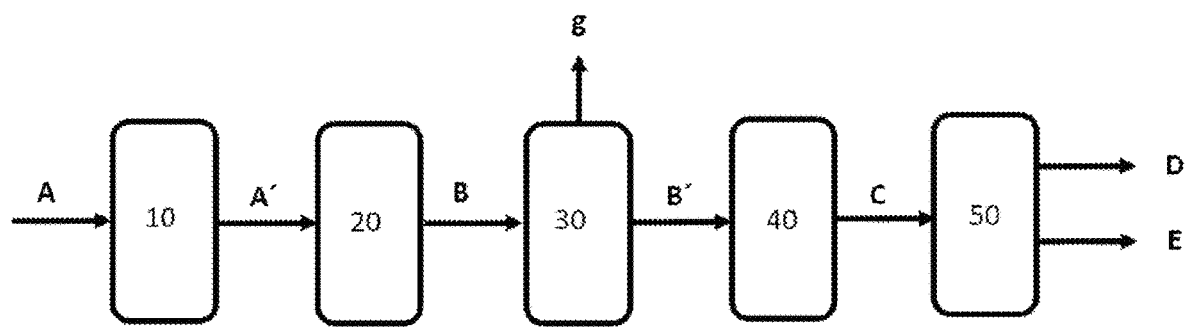

METHOD FOR PRODUCING RENEWABLE C3 HYDROCARBONS AND RENEWABLE AROMATIC HYDROCARBONS

CROSS-REFERENCE TO RELATED APPLICATIONS

This application is the U.S. national phase of International Application No. PCT/FI2022/050765 filed Nov. 21, 2022, which designated the U.S. and claims priority to FI 20216355 filed Dec. 27, 2021, the entire contents of each of which are hereby incorporated by reference.

FIELD

The present disclosure relates to a method for producing renewable C3 hydrocarbons and renewable aromatic hydrocarbons from renewable feedstock, in particular to methods comprising hydrodeoxygenation followed by catalytic cracking catalysed by 12-membered ring zeolites.

BACKGROUND

Petrochemicals are a growing business area and propylene is the second most important starting product in the petrochemical industry after ethylene. Nearly two thirds of all demand of propylene is used for manufacturing of polypropylene.

There is an increasing demand to use renewable polyethene and polypropene. However, there is very limited production capacity available for producing the renewable chemicals that are used in polymerization processes. Steam cracking of naphtha cannot meet the demand alone. Fluid catalytic cracking (FCC) is expected to be one of the main sources of propylene. Propylene is also manufactured from propane via dehydrogenation.

Aromatic hydrocarbons are among the most important building blocks of the chemical industry as they can be used in the preparation of plastic materials, chemicals, and coatings, such as paint and glue, which are made from the aromatic chemical compounds of benzene, toluene, xylene, and phenol. Out of the BTX chemicals, i.e. a mixture of benzene, toluene and xylene, p-xylene is the most expensive, but it can also be produced from toluene. p-Xylene is used for the production of polyethylene terephthalate (PET). PET demand has been forecasted to grow 4% annually. Toluene is used mainly for toluene di-isocyanate (TDI), and the annual growth rate of TDI demand is expected to be 3.6%. The price of benzene is between toluene and xylene, and the growth rate of benzene demand has been around 2.6% annually. Benzene is mainly used for the production of ethyl benzene and cumene.

Even though petrochemical based products continue to dominate the markets, there has recently been increased interest shown towards more sustainable alternatives like 100% biobased drop-in aromatic chemicals which are chemically identical to their petroleum-derived counterparts. Renewable aromatics, i.e. aromatics manufactured from renewable feedstock, have been processed using e.g. pyrolysis of biomass, aqueous phase reforming or obtained as side products in the oligomerization of light renewable olefins.

WO2021119610A1 discloses a method for production of renewable crude oil from plant oils and animal fats the method comprising pretreatment, hydroprocessing, isomerization, hydrocracking and/or dewaxing steps.

WO2009130392A1 discloses a process for preparation of renewable C2-C8 hydrocarbons by cracking catalytically one or more hydrocarbons which have been obtained from natural fat or derivatives thereof at 250-450 C using a zeolite catalyst.

Cheng et al (Renewable and Sustainable Energy Reviews, Elsevier, 2017, Vol 72, pp 673-722) disclose a four-step pathway of pre-treatment, depolymerization, hydrodeoxygenation and alkylation to convert lignin into jet-fuel range aromatic hydrocarbons and cycloalkanes.

Accordingly, there is a need for novel methods for producing both the renewable C3 hydrocarbons and the renewable aromatic hydrocarbons.

SUMMARY

The present invention is based on the observation that when a feedstock of biological origin, i.e. renewable feedstock, was hydrodeoxygenated followed by catalytic cracking using a catalyst comprising a zeolite and a support, wherein the zeolite is a 12-membered ring zeolite with a pore size below 0.7 nm, renewable C3 hydrocarbons and renewable aromatic hydrocarbons can both be obtained.

Accordingly, it is an object of the present invention to provide a method for producing renewable C3 hydrocarbons and renewable aromatic hydrocarbons from a renewable feedstock selected from animal oils, animal fats, plant oils, vegetable oils, microbial oils, and mixtures thereof, the method comprising the following steps:
  a) providing a renewable feedstock,
  b) pre-treating the renewable feedstock by reducing the amount of impurities therein not to include: more than 10 w-ppm alkali metal and alkaline earth metal impurities, calculated as elemental alkali metals and alkaline earth metals; more than 10 w-ppm other metals, calculated as elemental metals; more than 1000 w-ppm nitrogen containing impurities, calculated as elemental nitrogen; more than 30 w-ppm phosphorus containing impurities, calculated as elemental phosphorus; more than 5 w-ppm silicon containing impurities, calculated as elemental silicon; to produce a pre-treated feedstock,
  c) subjecting the pre-treated feedstock to hydrodeoxygenation reaction to produce a hydrodeoxygenated stream, wherein the hydrodeoxygenation reaction comprise one or more of:
    a. a temperature in the range from 250° C. to 400° C.,
    b. a pressure in the range from 10 bar to 200 bar,
    c. a WHSV in the range from 0.25 $h^{-1}$ to 3 $h^{-1}$,
    d. a $H_2$ flow from 350 to 1500 N-L $H_2$/L feed, and
    e. a hydrodeoxygenation catalyst selected from Pd, Pt, Ni, Co, Mo, Ru, Rh, and W or any combination thereof, on a support,
  d) subjecting the hydrodeoxygenated stream to a gas-liquid separation to produce a gaseous stream and a hydrodeoxygenated liquid stream,
  e) subjecting the hydrodeoxygenated liquid stream to catalytic cracking reaction comprising
    i. a temperature in the range from 300° C. to 700° C., preferably in the range from 330° C. to 500° C.,
    ii. a residence time from 0.2 s to 7200 s, and
    iii. a catalyst comprising a zeolite and a support, wherein the zeolite is ZSM-12 with a pore size below 0.7 nm,
  to produce a catalytically cracked stream, and subsequently
  f) separating the catalytically cracked stream at least to i) a fraction comprising the renewable C3 hydrocarbons, and ii) a fraction comprising the renewable aromatic hydrocarbons.

Zeolite catalyst according to the present disclosure provides in a catalytic cracking unit a high selectivity towards liquified petroleum gases (LPG), especially high selectivity towards C3 hydrocarbons. Besides the C3 hydrocarbons, a high selectivity to aromatic hydrocarbons desired in the petrochemical industry and in gasoline and aviation fuel was observed. In addition to the high yield of renewable C3 hydrocarbons and renewable aromatic hydrocarbons, the catalytic cracking of renewable hydrocarbons from hydrodeoxygenation unit functions well at temperatures, as low as 300° C., whereas typical catalytic cracking processes operate at reaction temperatures of from 500° C. to 550° C.

A number of exemplifying and non-limiting embodiments of the invention are described in accompanied dependent claims.

Various exemplifying and non-limiting embodiments of the invention together with additional objects and advantages thereof, will be best understood from the following description of specific exemplifying and non-limiting embodiments when read in connection with the accompanying FIGURE.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e., a singular form, throughout this document does not exclude a plurality.

BRIEF DESCRIPTION OF DRAWING

FIG. 1 shows an exemplary non-limiting schematic overview of simultaneous production of renewable C3-hydrocarbons and renewable aromatic hydrocarbons according to an embodiment of the method of the present invention.

DESCRIPTION

FIG. 1 shows an exemplary process of the present invention for combined production of renewable C3 hydrocarbons and renewable aromatic hydrocarbons. In the FIGURE reference numbers and arrows illustrate reactions and streams, respectively.

According to one embodiment, the method comprises the following steps:
a) providing a renewable feedstock of biological origin A,
b) pre-treating 10 the feedstock to produce pre-treated feedstock A',
c) subjecting the pre-treated feedstock to hydrodeoxygenation 20 reaction to produce hydrodeoxygenated stream B,
d) subjecting the hydrodeoxygenated stream to a gas-liquid separation 30 to produce a gaseous stream g and a hydrodeoxygenated liquid stream B',
e) subjecting the hydrodeoxygenated liquid stream to catalytic cracking 40 reaction to produce a catalytically cracked stream C, and
f) separating 50 the catalytically cracked stream at least to
i) a fraction D comprising the renewable C3 hydrocarbons, and
ii) a fraction E comprising the renewable aromatic hydrocarbons.

The Feedstock

A process for preparing hydrocarbons from an oxygenated renewable hydrocarbon feedstock is disclosed. Examples of oxygenated hydrocarbon feedstocks are fatty acids and triglycerides, which are present in large amounts in e.g., plant oils and animal fats. An oxygenated hydrocarbon feedstock of renewable origin, such as plant oils and animal fats, is well suited for the process. The majority of these plant oils and animal fats are typically composed of fatty acids, either as free fatty acids or as esters of free fatty acids, such as fatty acids of 25 wt-% (weight percent) or 40 wt-% or more. Examples of esters of free fatty acids are fatty acid glyceride esters (mono-, di- and/or tri-glyceridic) or for example the fatty acid methyl esters (FAME) or fatty acid ethyl esters (FAE). Accordingly, the oxygenated hydrocarbon feedstocks of renewable origin may contain 25 wt-% or more of fatty acids or fatty acid esters.

The renewable character of carbon-containing compositions, such as feedstocks and products of biological origin, i.e. renewable feedstock, and products, can be determined by comparing the $^{14}C$-isotope content of the feedstock to the $^{14}C$-isotope content in the air in 1950. The $^{14}C$-isotope content can be used as evidence of the renewable origin of the feedstock or product. Carbon atoms of renewable material comprise a higher number of unstable radiocarbon ($^{14}C$) atoms compared to carbon atoms of fossil origin. Therefore, it is possible to distinguish between carbon compounds derived from biological sources, and carbon compounds derived from fossil sources by analysing the ratio of $^{12}C$ and $^{14}C$ isotopes. Thus, a particular ratio of said isotopes can be used to identify and quantify renewable carbon compounds and differentiate those from non-renewable i.e. fossil carbon compounds. The isotope ratio does not change in the course of chemical reactions. Examples of a suitable method for analysing the content of carbon from biological sources is ASTM D6866 (2020). An example of how to apply ASTM D6866 to determine the renewable content in fuels is provided in the article of Dijs et al., Radiocarbon, 48(3), 2006, pp 315-323. For the purpose of the present invention, a carbon-containing material, such as a feedstock or product is considered to be of renewable origin if it contains 90% or more modern carbon, such as 100% modern carbon, as measured using ASTM D6866.

The feedstock may include animal and fish oils/fats, plant oils and/or vegetable oils and/or microbial oils like babassu oil, palm seed oil, carinata oil, olive oil, coconut butter, soybean oil, canola oil, coconut oil, muscat butter oil, rapeseed oil, peanut oil, sesame oil, maize oil, sunflower oil, poppy seed oil, cottonseed oil, soy oil, laurel seed oil, crude tall oil, tall oil, tall oil fatty acid, tall oil pitch, crude palm oil, palm oil, palm oil fatty acid distillate, jatropha oil, palm kernel oil, camelina oil, archaeal oil, bacterial oil, fungal oil, protozoal oil, algal oil, muscat butter oil, seaweed oil, mustard seed oil, oils from halophiles, lauric-myristic acid group (C12-C14) including milk fats, palmitic acid group (C16) including earth animal fats, stearic acid group (C18) including earth animal fats, linoleic acid group (unsaturated C18) including whale and fish oils, erucic acid group (unsaturated C22) including whale and fish oils, oleo stearic acid group (conjugated unsaturated C18) including whale and fish oils, fats with substituted fatty acids (ricin oleic acid, C18) such as castor oil, and mixtures of any two or more thereof.

The oils of the feedstock may be classified as crude, degummed, heat treated and RBD (refined, bleached, and deodorised) grade, depending on the level of pre-treatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, and mixtures of any two or more thereof.

The feedstock may include derivatives of natural fats include mono- or diglycerides of C10-C28 fatty acids, C10-C28 fatty acids, C10-C28 fatty acid anhydrides, non-glyceride C10-C28 fatty acid esters, C10-C28 fatty alcohols, C10-C28 fatty aldehydes and C10-C28 fatty ketones. The C10-C28 fatty acids, their mono- and diglycerides are typically prepared by hydrolysis of the corresponding triglyceride. The non-glyceride C10-C28 fatty acid esters are mainly prepared from the triglycerides by transesterification. The C10-C28 fatty alcohols, aldehydes and ketones are prepared by reduction, usually by hydrogenation, of the corresponding fatty acids. Advantageously, the feedstock hydrocarbons may be of C10-C24.

The derivatives of natural fats also include any of the aforementioned natural fats and derivatives, the hydrocarbon chain of which has been modified, e.g., by substitution, branching or saturation.

According to a particular embodiment the feedstock is selected from waste and residues from animal fat or oil, plant fat or oil, and fish fat or oil, and mixtures thereof.

An exemplary feedstock comprises at least triglycerides. Most typical exemplary feedstocks are animal fats and palm oil fatty acid, especially those originating from waste and residues.

A further exemplary feedstock comprises at least fatty acids. Most typical feedstock are various plant oils, and tall oil materials, such as crude tall oil.

The natural fats or derivatives thereof may be provided in pure form or as part of a feedstock containing other components. Preferably, the feedstock contains at least 20 wt-% (weight percent), more preferably at least 30 wt-%, most preferably at least 40 wt-%, of pure natural fat or natural oil or their derivatives.

An exemplary renewable feedstock preferably includes waste and residue materials originating from animal fat/oil, plant fat/oil or fish fat/oil. These may comprise sludge palm oil, such as palm effluent sludge (PES) or palm oil mill effluent (POME), used cooking oil (UCO), acid oils (ASK), brown grease (BG), sludge palm oil, spent bleaching earth oil (SBEO), technical corn oil (TCO) or lignocellulosic based oils, municipal solid waste-based oils, or algae-based oils. Most preferably, the feeds include UCO, sludge palm oil, TCO and algae-based oils.

Pre-Treatment

Typically, the waste and residue materials contain a wide variety of heteroatomic compounds, which often are more difficult to remove by conventional feedstock pre-treatments typically used for pre-treatment of matrices comprising triacylglycerols. The waste and residue materials may comprise accumulated alkali and alkaline earth metals, such as sodium, potassium, calcium, magnesium; other metals such as iron or copper; nitrogen containing compounds, such as amines and amides; phosphorus containing compounds, such as phospholipids; silicon containing compounds, such as siloxanes and polydimethylsiloxanes (PDMS); halides, sulphur containing compounds, etc. depending on the type of residue/waste. These materials are typically harmful for the catalyst used in hydrotreatment and isomerization and need to be decreased or removed before entering the feedstock onto the catalysts.

Depending on the level of pre-treatment, fats, oils, and greases may contain high amounts of impurity materials e.g., about 1-1000 w-ppm (ppm by weight) phosphorus; and about 1-500 w-ppm total metals, mainly sodium, potassium, magnesium, calcium, iron, and copper. Nor is it uncommon that animal fat can contain e.g., 1000 w-ppm or even higher nitrogen measured as elemental nitrogen.

The feedstock of the present method needs to be suitable for hydrodeoxygenation. Typically, the feedstock entering into a hydrodeoxygenation reactor or a catalyst bed thereof should not include more than 10 w-ppm, preferably not more than 5 w-ppm, more preferably not more than 1 w-ppm alkali metal and alkaline earth metal impurities, calculated as elemental alkaline and alkaline earth metals; not more than 10 w-ppm, preferably not more than 5 w-ppm, more preferably not more than 1 w-ppm other metals, calculated as elemental metals; not more than 1000 w-ppm, preferably not more than 500 w-ppm, more preferably not more than 150 w-ppm, most preferably not more than 50 w-ppm, such as not more than 5 w-ppm, such as not more than 1 w-ppm nitrogen containing impurities, calculated as elemental nitrogen; not more than 30 w-ppm, preferably not more than 15 w-ppm, more preferably not more than 5 w-ppm, such as not more than 1 w-ppm phosphorus containing impurities, calculated as elemental phosphorus; not more than 5 w-ppm, preferably not more than 1 w-ppm silicon containing impurities, calculated as elemental silicon; optionally not more than 100 w-ppm, preferably not more than 50 w-ppm, most preferably not more than 30 w-ppm, such as not more than 10 w-ppm, such as not more than 5 w-ppm sulphur containing impurities, calculated as elemental sulphur, and optionally not more than 20 w-ppm, preferably not more than 10 w-ppm, more preferably not more than 5 w-ppm chlorine containing impurities, calculated as elemental chlorine. Depending on the efficiency of the hydrotreating catalyst bed system and the hydrotreatment reactor unit configuration even a high amount of nitrogen impurities in the feed may be tolerated, and the effluent from the HDO may contain suitably low amount of nitrogen impurities to enable subjecting it to subsequent catalytic processes.

There are several known methods to remove or decrease the amount of harmful materials, and varying purification or pre-treatment methods are commonly applied. Exemplary pre-treatment methods suitable for the present disclosure comprise treating with mineral acids, degumming, treating with hydrogen, heat treating, deodorizing, washing with water, treating with base, demetallation, distillation, removal of solids, bleaching, and any combinations thereof.

Contaminating metals may be removed from the feedstock e.g., by treatment with mineral acids. Phosphorus which mostly occurs in the form of phosphates may be removed by degumming. Triglycerides can also be pre-hydrogenated (pre-treated with hydrogen). Besides reducing the amount of oxygen containing compounds (HDO), unsaturation, sulphur, and nitrogen content (HDS, HDN) are reduced. Solid feedstocks such as fats, in turn should be liquified e.g., by heating prior to subjecting to hydrodeoxygenation. Pre-treatment of solid feedstocks may further include one or more of: grinding, agitating, filtering, and sonicating. The feedstock may further be bleached and/or deodorized.

The pre-treatment can be selected from heat treatment optionally followed by evaporation of volatiles; heat treatment with adsorbent (HTA), optionally followed by flash evaporation; degumming; bleaching. According to one embodiment the pre-treatment includes any one of, any combination of, or all of a degumming step, a chemical treating step, a water-wash step, a demetallation step, a bleaching step, a full (or partial) hydrogenation step, an acid gas removal step, and/or a water removal step. The pre-treatment also typically comprises a step of removing impurities from the feedstock, including any suitable removal of solids from a liquid, including filtration, centrifugation, and sedimentation; and removing volatiles from liquid, e.g., by evaporation. In the pre-treatment the feedstock comprising organic material of biological origin, as previously defined, is purified and a purified feedstock is obtained.

In one embodiment the pre-treatment is selected from heat treatment optionally followed by evaporation of volatiles, whereby the feedstock is heated at a temperature of from 80° C. to 325° C., preferably 180° C. to 300° C., more preferably 200° C. to 280° C., in a residence time from 1 to 300 min. The heat treatment can be followed by an evaporation step, where especially silicon and phosphorous containing compounds are removed. An example of heat treatment of a feedstock comprising organic material can be found in WO 2020/016405. Heat treatment can also be followed by filtration as an addition or an alternative to evaporation. When the feedstock comprises brown grease or acidulated soap stock the pre-treatment comprises typically heat treatment with or without a filter-aid (adsorbent) followed by filtration and possible bleaching.

In one embodiment the pre-treatment is selected from heat treatment with adsorbent (HTA) optionally followed by flash evaporation. HTA as pre-treatment is especially suitable when the feedstock comprises CTO and/or TOP, but HTA is also suitable for other feedstocks. Heat treatment with adsorbent (HTA) can be performed in a temperature from 180° C. to 325° C., preferably from 200° C. to 300° C., more preferably from 240° C. to 280° C., optionally in the presence of an acid. The adsorbent can be selected from alumina silicate, silica gel and mixtures thereof and is typically added in an amount of 0.1 wt-% to 10 wt-%, such as 0.5 wt-%. An example of HTA can be found in WO 2020/016410.

In one embodiment the pre-treatment is selected from bleaching. Bleaching can be conducted by acid addition in an amount of from 500 to 5000 ppm based on feed. The bleaching treatment can be performed in a temperature from 60° C. to 90° C. and including a drying step in 110° C. to 130° C. The bleaching is finished by a filtration step to remove formed solids and possible filter aids. In one example bleaching includes the following sequence
 (1) acid addition 1000-4000 ppm citric acid (50 wt-% water) 85° C., 10 min;
 (2) adsorbent/filter aid addition 0.1-1 wt-%, 85° C., 800 mbar, 20 min;
 (3) drying 120° C., 80 mbar, 25 min
 (4) filtering 120° C., 2.5 bar.

Both heat treatment (HT) and heat treatment with adsorbent (HTA) can be performed under pressure, the pressure can be 500 to 5000 kPa. Also, water can be added before or during HT and HTA to a level of up to 5 wt-%, such as 1 wt-%-3 wt-%. The evaporation e.g., flashing can be performed after HT or HTA or any other pre-treatment stage and can be performed at about 160° C., such as from 150° C. to 225° C., in a pressure of 10 to 100 mbar.

In one embodiment the pre-treatment comprises heat treatment (HT) and bleaching.

In one embodiment the pre-treatment comprises heat treatment (HT) with alkali addition and bleaching.

In one embodiment the pre-treatment comprises heat treatment with adsorption (HTA) followed by flash (removal of light components comprising Si components etc. by evaporation) and bleaching.

In addition, the pre-treatment may or may not include additional steps such as removal of solids (using technologies such as centrifugation or filtration) before and/or after HT or HTA, water washing, degumming, hydrolysis, distillation, strong acid treatment, 2nd bleaching or any combination of the mentioned methods.

Feedstock suitably purified by pre-treatment prolongs the catalyst life cycle in hydrodeoxygenation and subsequent reactions like isomerization or cracking.

Hydrodeoxygenation

As defined herein deoxygenation is a method for the removal of covalently bound oxygen from organic molecules. Hydrodeoxygenation refers herein to removal of oxygen as $H_2O$, $CO_2$ and/or CO from the oxygen containing hydrocarbons by hydrodeoxygenation, decarboxylation and/or decarbonylation. Whereas during catalytic cracking, there will be acid catalysed breaking down of C—C bonds of hydrocarbons or breaking down long chained hydrocarbons to form shorter hydrocarbon chains or branching or cyclisation without the need for presence of molecular hydrogen, merely under the influence of a suitable catalyst.

As defined herein hydrogenation is a method for saturation of carbon-carbon double bonds by means of molecular hydrogen under the influence of a catalyst.

The hydrotreatment comprising deoxygenation and catalytic cracking may be conducted in separate reactors, or at least in multiple catalyst bed systems in separate catalyst beds due to different requirements for reaction conditions. Preferably, the deoxygenation and catalytic cracking are conducted in separate deoxygenation and catalytic cracking steps in subsequent catalyst beds in separate reactors. This will provide flexibility to optimise process conditions separately to favour each type of process. Moreover, this further enables removal of unwanted components in between the processes, enhancing the selectivity and yield of the latter process.

According to the present method the pre-treated feedstock of biological origin is subjected to hydrodeoxygenation to produce a hydrodeoxygenated stream i.e. hydrodeoxygenation effluent. Typically, the hydrodeoxygenated stream comprises mainly liquid paraffins, such as more than 90 wt-%, preferably more than 99 wt-%, such as about 100 wt-%.

According to the present method the pre-treated feedstock is subjected to hydrodeoxygenation. The hydrodeoxygenation of renewable oxygen containing hydrocarbons is performed at reaction conditions comprising one or more of
 a. a temperature in the range from 250° C. to 400° C., preferably from 260° C. to 380° C., more preferably from 280° C. to 360° C., such as from 300° C. to 330° C.,
 b. a pressure in the range from 10 bar to 200 bar, preferably from 20 bar to 100 bar, more preferably from 20 bar to 80 bar,
 c. a weight hourly space velocity (WHSV) in the range from 0.25 $h^{-1}$ to 3.0 $h^{-1}$, preferably from 0.5 $h^{-1}$ to 3.0 $h^{-1}$, more preferably from 0.7 $h^{-1}$ to 2.5 $h^{-1}$, most preferably from 1.0 $h^{-1}$ to 2.0 $h^{-1}$, depending on the hydrogen consumption,
 d. a $H_2$ flow in the range from 350 to 1500 N-L $H_2$/L feed, more preferably from 350 to 1100 N-L $H_2$/L feed, most preferably from 350 to 1000 N-L $H_2$/L feed wherein N-L H$_2$/L means normal litres of hydrogen per litre of the feed into the HDO reactor, and e. a hydrodeoxygenation catalyst selected from Pd, Pt, Ni, Co, Mo, Ru, Rh, W, or any combination of these on a support, preferably Ni, Co, Mo, and W, on a support.

According to one embodiment the hydrodeoxygenation catalyst is selected from a group consisting of CoMo, NiMo, NiW, and CoNiMo on a support, wherein the support is preferably alumina and/or silica.

According to a particular embodiment the hydrodeoxygenation reaction conditions comprise temperature in the range from 250° C. to 400° C., pressure in the range from 20 bar to 80 bar, a WHSV in the range from 0.5 h$^{-1}$ to 3 h$^{-1}$, and H$_2$ flow of 350-1500 N-L H$_2$/L feed, and a hydrodeoxygenation catalyst.

In one embodiment, the hydrodeoxygenation hydrodeoxygenation (HDO) of renewable oxygen containing hydrocarbons is most preferably carried out in the presence of sulphided NiMo or sulphided CoMo catalysts on a support in the presence of hydrogen. Using a sulphided catalyst, the sulphided state of the catalyst may be maintained during the HDO step by an addition of sulphur in the gas phase or by using a feedstock having sulphur containing mineral oil blended with the renewable oxygen containing hydrocarbons. Sulphur may be deliberately added to the feedstock being subjected to hydrodeoxygenation, for example, within a range from 50 w-ppm (ppm by weight) to 20 000 w-ppm, preferably within a range from 100 w-ppm to 1000 w-ppm, when using hydrodeoxygenation catalysts requiring a sulphided form for operation.

Effective conditions for hydrodeoxygenation may reduce the oxygen content of the HDO effluent to less than 1 wt-%, such as less than 0.5 wt-% or less than 0.2 wt-%.

Purification of the Hydrodeoxygenated Stream

The effluent of the hydrodeoxygenation step, i.e. the hydrodeoxygenated stream, may be purified before subjecting it to the catalytic cracking. Typically, the purification includes subjecting the effluent to a gas-liquid separation i.e. removing gases, such as carbon monoxide, carbon dioxide, water, possible hydrogen disulphide and ammonia, and low boiling hydrocarbons, such as C1-C4 compounds which may be recycled back to the processing or recovered and combined later into corresponding product fractions, from the liquid hydrocarbon stream. In the gas-liquid separation the hydrodeoxygenated effluent is separated into a gaseous stream and into a hydrodeoxygenated liquid stream, which separation may be a stripping step or be followed by a stripping step, where the hydrotreated liquid stream may be stripped with a stripping gas, such as hydrogen. This may occur in a high temperature and/or high-pressure separation step, for example, at a temperature between 300° C. and 330° C. and pressure between 40 bar and 50 bar.

In one embodiment the obtained purified liquid hydrocarbon stream may be separated into suitable carbon number ranges for further processing e.g. by distillation.

The hydrodeoxygenated liquid stream used for catalytic cracking comprises preferably at least 92 wt-%, more preferably at least 95 wt-%, most preferably at least 99 wt-% paraffins of the total weight of the hydrocarbons. Typically the reminder comprises some oxygen. The effluent stream is still mainly in liquid form. The amount of n-paraffins is high, preferably more than 85 wt-%, more preferably more than 90 wt-%, e.g. such as 95 wt-%, especially when using NiMo/Al$_2$O$_3$ as the hydrodeoxygenation catalyst.

HDO effluent may optionally be subjected to at least a partial isomerisation at isomerisation conditions to obtain at least partially isomerised hydrocarbon stream, provided that gasses formed during HDO are first separated from the HDO effluent before entering it into isomerisation. The isomerisation conditions comprise an isomerisation catalyst, temperature, and pressures suitable thereto. Isomerisation may be performed in the presence of one or more catalyst(s) comprising a Group VIII metal and/or a molecular sieve, on a support. The metal is preferably Pt, Pd, or Ni. The molecular sieve may be selected from SAPO-11, SAPO-41, ZSM-22, ZSM-23 and fernerite. The support is selected from silica, alumina, clays, titanium oxide, boron oxide or zirconia, which can be used alone or as a mixture. The hydroisomerization may be performed at a temperature of 300-500° C., such as 300-370° C., and at a pressure of 10-150 bar, such 20-50 bar, in the presence of hydrogen. The optional isomerisation may be performed in the same reactor with HDO or in a separate reactor.

Effective conditions for hydrodeoxygenation may reduce the oxygen content of HDO effluent, to less than 1 wt-%, such as less than 0.5 wt-% or less than 0.2 wt-%.

It is generally known that alkane and paraffin are synonyms and can be used interchangeably. Isoparaffins (i-paraffins) are branched, open chain paraffins, and normal paraffins (n-paraffins) are unbranched linear paraffins. In the context of this disclosure, the term "paraffin" refers to n-paraffins and/or isoparaffins. Similarly, the term "paraffinic" refers herein to compositions comprising n-paraffins and/or isoparaffins.

Catalytic Cracking

Catalytic cracking of fossil oils using crystalline zeolites is known, for example, using fluid-bed catalytic cracking (FCC) units, moving bed, thermofor catalytic cracking (TCC) reactors, and fixed-bed crackers. It is also known to incorporate a crystalline zeolite into a matrix for catalytic cracking. For example, catalysts containing a zeolite having the structure of ZSM-12 together with large-pore crystalline zeolites have been used in catalytic cracking in the absence of added hydrogen for improving gasoline octane number and for co-producing C3-C5 olefins. However, the present disclosure provides use of a particular zeolite for co-production of renewable C3s and selected renewable aromatics, even at a low temperature, using a combined HDO and catalytic cracking process sequence.

The zeolite catalyst in the catalytic cracking unit of the present disclosure does not contain added metals like platinum or nickel i.e. the zeolite is not impregnated by these metals. In a conventional catalytic cracking catalyst, platinum or another metal is typically added for enhancing the regeneration of the catalyst. Since the highly paraffinic feedstock is used and the reaction temperature is low, there will be only a very small amount of coke formed during the catalytic cracking reaction, which may be removed at a considerably lower regeneration temperature compared to those that are typically used.

According to the present method, the catalytic cracking reaction, such as fluid catalytic cracking (FCC) reaction, is performed in the presence of a catalyst comprising a zeolite and a support, wherein the particularly advantageous zeolite is a 12-membered ring zeolite with a pore size below 0.7 nm. According to a preferred embodiment, the catalyst is 12-membered ring, 1-dimensional, ZSM-12 zeolite with a pore size below 0.7 nm, that advantageously is of MTW framework type having pore openings of about 5.5×6.1 Å.

The catalyst, preferably containing ZSM-12, of the present disclosure has advantageously an aluminium content from 0.1 wt-% to 1.5 wt-%, preferably from 0.6 wt-% to 1.3 wt-%. The BET surface area is advantageously from 200 m$^2$/g to 380 m$^2$/g, preferably from 250 m$^2$/g to 350 m$^2$/g, such as from 270 m²/g to 340 m²/g. The catalyst, preferably ZSM-12 zeolite, may have an acidity from 180 µmol/g to 500 µmol/g, preferably from 200 µmol/g to 450 µmol/g, more preferably from 200 µmol/g to 400 µmol/g, such as from 200 µmol/g to 300 µmol/g, or even such as from 230 µmol/g to 260 µmol/g, measured with $NH_3$-TPD method, which particular method is described and discussed in detail in the applicant's former patent application WO2006070073A1, p. 10. Moreover, the ratio of the Brønsted acid sites to the Lewis acid sites may be from 1.7 to 4, such as from 2.4 to 2.7, such as about 2.55, measured by pyridine FT-IR. In the method for determining the Brønsted acid sites to the Lewis acid sites a self-supported wafer is made out of a 100 mg sample. The sample is activated in the FT-IR cell at 450° C. for one hour and then cooled to 170° C. At this temperature pyridine is desorbed. The band around 1450 cm 1 is used to calculate the Lewis-acid sites while the band of pyrH+ on Brønsted sites is around 1540 $cm^{-1}$. The dimensions of the wafer and extinction factors of 1.42 and 1.88 are used for determination of the concentration of Lewis- and Brønsted-acid sites, respectively.

In one embodiment, the 12-membered ring zeolite is preferably ZSM-12, which is a 1-dimensional 12-membered ring, with a pore size below 0.7 nm. The advantage of a MTW framework type, as in ZSM-12, is the pore openings of about 0.55 nm×0.61 nm. The zeolite, preferably ZSM-12, of the present disclosure has advantageously an aluminium content from 0.1 wt-% to 1.5 wt-%, preferably from 0.6 wt-% to 1.3 wt-%. The BET surface area is advantageous from 200 m²/g to 380 m²/g, preferably from 250 m²/g to 350 m²/g, such as from 270 m²/g to 340 m²/g. The zeolite, preferably ZSM-12, may have an acidity from 180 µmol/g to 500 µmol/g, preferably from 200 µmol/g to 450 µmol/g, more preferably from 200 µmol/g to 400 µmol/g, such as from 200 µmol/g to 300 µmol/g, or even such as from 230 µmol/g to 260 µmol/g, measured with $NH_3$-TPD method, which particular method is described and discussed in detail in the applicant's former patent application WO2006070073A1, p. 10. Moreover, the ratio of the Brønsted acid sites to the Lewis acid sites may be from 1.7 to 4, such as from 2.4 to 2.7, such as about 2.55, measured by pyridine FT-IR.

Traditional catalysts used in an FCC unit comprise Y-zeolite and a matrix including binders. As an example, comparative tests were made using a commercially available FCC catalyst, FCC-ecat. The FCC-ecat contains Y-zeolite, which represents FAU framework type and is a 12 membered ring, 3-dimensional zeolite. In the Y zeolite, 0.73 nm pores are connected to larger "supercages" having about 1.3 nm in diameter.

The term support in this patent application also includes a matrix comprising a binder and/or filler following the definitions used for the regular FCC catalysts. The support may comprise amorphous silica, alumina, silica-alumina, a clay material, such as kaolin or bentonite, that may be further thermally or chemically treated. Depending on the type of reactor used in the catalytic cracking, the support needs to meet different specifications related to mechanical strength and formability. For example, a catalyst with a silica support deactivates slowly which has an advantage when the cracking reaction is performed in the fixed or moving bed reactor.

The catalytic cracking step of the present disclosure is performed at a temperature from 300° C. to 700° C., preferably from 330° C. to 500° C. The processing temperature refers to the temperature at the process inlet. An exemplary temperature is 330-470° C. Residence time may be from 0.2 s to 7200 s. The catalytic cracking process conditions comprise typically a pressure from 1 bar to 40 bar. It was observed that when the reaction was performed above atmospheric pressure the cracking was decreased compared to when the reaction was performed at atmospheric pressure.

According to one embodiment, catalytic cracking is performed at a temperature from 330° C. to 550° C., such as from 430° C. to 470° C., or about 450° C., with a residence time from 2 min to 2 h. These conditions are particularly suitable for e.g. moving bed cracking process.

According to another embodiment, catalytic cracking is performed at a temperature from 300° C. to 550° C. such as from 430° C. to 470° C., or at about 450° C., with a residence time from 30 minutes to 2 h. These conditions are particularly suitable for e.g. fixed bed cracking processes.

According to yet another embodiment catalytic cracking is performed at a higher temperature i.e. from 450° C. to 700° C., such as from 600° C. to 670° C., or about 650° C., with a residence time from 0.2 s to 10 s. These conditions are particularly suitable for e.g. an FCC reactor.

The catalytic cracking process may be performed without any added hydrogen, such as molecular hydrogen, to enhance the cracking over hydrogen associated reactions. However, a minor amount of hydrogen may result from the reactions taking place during cracking.

Alternatively, the cracking process may be performed in the presence of an inert gas, such as nitrogen, $CO_2$, steam or maybe even methane which can be considered inert when cracking is performed without metals, thereby decreasing the partial pressure of the product gases and thus influencing on e.g. the coking. According to an exemplary embodiment the catalytic cracking is performed in the presence of nitrogen flow.

An exemplary pressure when using an inert gas may be around the atmospheric pressure, i.e. at about 1 bar, or slightly above. The WHSV may be from 1 $h^{-1}$ to 10 $h^{-1}$, preferably from 2 $h^{-1}$ to 5 $h^{-1}$.

In catalytic cracking a carbon-rich by-product, namely coke, is typically formed from hydrocarbons and deposited on the used catalyst surface. The formed coke gradually leads to deactivation of the catalyst. A coked catalyst is typically regenerated by burning off the coke with air. Depending on reactor type used, this regeneration may be done offline or online.

Separation

The effluent from the catalytic cracking i.e. the catalytically cracked stream is separated into different fractions using known separation methods. The catalytic cracking effluent may be removed from the used reactor via an overhead line, cooled and sent to fractionation, such as a fractionator tower, for recovering of the various cracking products. The recovery may be conducted in several steps.

The recovery may comprise one or more of distilling, fractionating, evaporating, flash-separating, membrane separating, extracting, using extractive-distillation, using chromatography, using molecular sieve adsorbents, using thermal diffusion, complex forming, crystallising, preferably at least fractionating and distilling. Recovery may comprise multiple unit operations in succession.

In a certain embodiment, the gaseous C1-C4 hydrocarbons are separated from the C5+ hydrocarbons. Subsequently, the renewable C3 hydrocarbons are separated and recovered from the C1-C2 hydrocarbons and from C4 hydrocarbons. The renewable C3 hydrocarbons comprise propane and propylene, preferably the propane being the dominant compound.

In a certain embodiment, the method further comprises separating and recovering the renewable aromatic hydrocarbons from the fraction rich in C5-C10 hydrocarbons, preferably to a level of at most 1 wt-%, based on the total weight of the fraction rich in C5-C10 hydrocarbons. This may be achieved e.g., by solvent extraction, or any other known method.

The cracked stream is separated into fractions of which at least two are recovered as products, namely
(i) a fraction comprising renewable C3 hydrocarbons, and
(ii) a fraction comprising renewable aromatic hydrocarbons.

In one embodiment, the cracked stream is separated into fractions of which at least two are recovered as products, namely (i) a fraction rich in renewable C3 hydrocarbons, and (ii) a fraction rich in renewable aromatic hydrocarbons. The fraction comprising renewable C3 hydrocarbons is a fraction rich in renewable C3 hydrocarbons or enriched in renewable C3 hydrocarbons, compared to the cracked stream. This means that in the context of the present disclosure that the amount of the renewable C3 hydrocarbons in said fraction is higher than the amount of any other single compound present in said fraction. In other words, the fraction comprising renewable C3 hydrocarbons comprises renewable C3 hydrocarbons as the most abundant compounds. Preferably, the fraction comprising renewable C3 hydrocarbons comprises more than 50 wt-%, such as more than 70 wt-% renewable C3 hydrocarbons based on the total weight of the fraction comprising renewable C3 hydrocarbons. The fraction comprising renewable aromatic hydrocarbons is rich in renewable aromatic hydrocarbons or enriched in renewable aromatic hydrocarbons compared to the cracked stream. This means that, in the context of the present disclosure, the amount of the renewable aromatic hydrocarbons is higher than the amount of any other single compound present in the fraction comprising renewable aromatic hydrocarbons, in other words that the fraction comprising renewable aromatic hydrocarbons as the most abundant compounds. Preferably, the fraction rich in renewable aromatic hydrocarbons comprises more than 50 wt-%, such as more than 70 wt-%, renewable aromatic hydrocarbons, based on the total weight of the fraction comprising renewable aromatic hydrocarbons. The renewable aromatic hydrocarbons comprise one or more of benzene, toluene, ethyl benzene, m-xylene, p-xylene, o-xylene, naphthalene.

The recovered fractions may be subject to one or more further purification and/or fractionation steps. The optional purification and/or fractionation steps or treatments may be selected depending on the intended end use and/or desired degree of purity of the recovered renewable C3 hydrocarbons and renewable aromatic hydrocarbons, and/or any other recovered cracking effluent fraction.

In one embodiment the uncracked hydrocarbons, the longer carbon chain hydrocarbons, or the fractions not recovered for product purposes may be recycled back to catalytic cracking.

The possible remainder of hydrocarbons higher than C16 may be recovered and used for e.g. diesel fuel production.

The used ZSM-12 catalyst was able to produce a surprisingly high share of C3 hydrocarbons in the gas phase compared to several other catalysts tested. For example, compared to ZSM-5 less methane and ethane was produced.

Moreover, due to the larger pore size of ZSM-12 compared to e.g. ZSM-5 the aromatics yield distribution is different. For example, there is a more pronounced tendency to produce o-xylene and m-xylene, an increase of more than 30 wt-% was observed. Similarly, the ethyl benzene formation was increased by 15% and the amount of 1,2,4-trimethyl benzene (TMB) was increased more than fivefold.

As a comparison, tests were made using FCC-ecat for cracking the hydrodeoxygenation effluent. Use of the conventional catalyst clearly yields a smaller amount of renewable aromates, such as about or below 30 wt-%, compared to the about 75 wt-% obtained by the described ZSM-12 preferred catalyst, based on the C5-C10 fraction at the optimum temperatures.

Moreover, the ZSM-12 catalyst showed significant activity, 80 wt-% conversion already at 350° C., thus being a good candidate for low temperature cracking. Due to the low temperature the coking effect is suppressed leading to reduced carbon oxide emissions. Furthermore, the 1-dimensional structure of ZSM-12 consisting of perfect tubes prevents the trapping of coke precursors. Thus, coke formation is limited and less pronounced. Moreover, the rate of coke formation at low temperature will be depressed and less feedstock will eventually end up in the coke. The regeneration of coke further leads to carbon dioxide emissions that should be avoided as much as possible. The lower yield of coke yields to less $CO_2$ produced in the catalyst regeneration step, which is in accordance with the future target of carbon neutral production by reducing the GHG emissions directly.

The use of an inert gas like nitrogen results in a higher share of propylene compared to propane.

The final yields and selectivities of the renewable C3 hydrocarbons and the renewable aromatic hydrocarbons depend on the particular feedstock used. However, the feed carbon number distribution does not change the overall tendency for increased recovery of the C3s and aromatic hydrocarbons.

Renewable aromatic hydrocarbons are large volume commodity chemicals with diverse applications. For example, the standard specification for aviation turbine fuel containing synthesised hydrocarbons ASTM D7566 (2021) includes the need of aromatic hydrocarbons to fulfil the required properties for Jet A1 aviation fuel. For synthetic fuels, which contain no aromatic hydrocarbons, their maximum content in blends range from 42 vol-% to 63 vol-% depending on the content of the aromatic hydrocarbons. An amount of 8 vol-% aromatic hydrocarbons restriction does not limit maximum blend ratios.

Aromatic hydrocarbons may especially contribute to the ability of nitrile O-rings to swell, they are necessary to ensure the swelling of nitrile O-rings and seals that have been previously exposed to fuel that had a high aromatic content.

Propane may be dehydrogenated into propylene by technologies like propylene dehydrogenation (PDH), even though steam cracking remains as the dominant technology for producing propylene in the chemical industry as judged by the scale.

The present invention also concerns the use of a catalyst comprising a zeolite and a support, wherein the zeolite is a 12-membered ring zeolite with a pore size below 0.7 nm for producing renewable C3 hydrocarbons and renewable aromatic hydrocarbons from a renewable paraffinic feed by catalytic cracking at a temperature a temperature in a range from 300° C. to 700° C., preferably in a range from 330° C. to 500° C. and a residence time from 0.2 s to 7200 s. A preferable zeolite is ZSM-12. The zeolite has preferably one or more of the following properties
an aluminium content from 0.1 wt-% to 1.5 wt-%, preferably from 0.6 wt-% to 1.3 wt-%, BET surface area from 200 m²/g to 380 m²/g, preferably from 250 m²/g to 350 m²/g, acidity from 180 μmol/g to 550 μmol/g determined by NH$_3$-TPD method, wherein acidity is calculated from the amount of NH$_3$ adsorbed at 200° C. and desorbed between 100° C. and 500° C., and ratio of the Brønsted acid sites to the Lewis acid sites is 1.7-4 determined by pyridine FT-IR.

Experimental

Experiments were made using the described most preferred ZSM-12 containing catalyst in a MAT type of fixed-bed cracking reactor. The experiments focused on the cracking of an HDO effluent type product using ZSM-12 and a commercially available FCC equilibrium catalyst (FCC-ecat) as a comparative catalyst in atmospheric pressure (N$_2$ flow) at 350-650° C. Different temperatures were used for the tested catalysts due to different thermal limits of the materials. WHSV was either 3 h$^{-1}$ or 7.7 h$^{-1}$ and catalyst/feed ratio was 1.3 or 1.0 (g/g), respectively. n-Hexadecane was used as feed simulating HDO effluent. Between the tests, the catalysts were regenerated in-situ.

The results can be summarised as follows:

Both ZSM-12 and FCC-ecat reached about 20 wt-% C3 total yield (WHSV 3 h$^{-1}$).

The share between propylene and propane differed among the catalysts. ZSM-12 yielded more propane than FCC-ecat.

With ZSM-12, C3s yield increased with increasing temperature and also the olefinicity of C3s increased with the temperature. This enables adjusting the yield based on need by the chosen reaction temperature.

The PIONA analysis (n-paraffins, iso-paraffins, olefins, naphthenes and aromatics) revealed that the liquid product of the ZSM-12 catalysed process was highly aromatic (75 wt-% at 450° C.). Most of the compounds were BTX chemicals, and toluene was the most abundant. The main aromatic compounds (wt-%) of the liquid products obtained by catalytically cracking the feed using ZSM-12 are presented in Table 1.

TABLE 1

| Aromatic compound | wt-% |
| --- | --- |
| Benzene | 4.0 |
| Toluene | 17 |
| Ethyl benzene | 3.0 |
| m-xylene | 6.7 |
| p-xylene | 2.6 |
| o-xylene | 2.9 |
| Naphthalene | 1.7 |
| 1,2,4-trimethyl benzene | 2.7 |
| Total benzene, toluene, xylenes | 33 |

The main advantages of the experiments are that by using ZSM-12 as part of the cracking catalyst for the highly paraffinic effluent, it is possible to produce high amounts of C3 hydrocarbons together with aromatic hydrocarbons from the renewable n-paraffins with good yield (85 wt-% conversion, Table 2) at low temperature, thus reducing the formation of coke, and thus decreasing the amount of CO$_2$ generation. Table 2 shows the feed conversion (wt-%) as a function of reaction temperature, when the WHSV was 3 h$^{-1}$.

TABLE 2

| Catalyst | t = 350° C. | t = 450° C. | t = 550° C. | t = 600° C. | T = 650° C. |
| --- | --- | --- | --- | --- | --- |
| ZSM-12 | 85 | 95 | NA | NA | NA |
| FCC-ecat | NA | NA | 95 | NA | 98 |

The specific examples provided in the description given above should not be construed as limiting the scope and/or the applicability of the appended claims. Lists and groups of examples provided in the description given above are not exhaustive unless otherwise explicitly stated.

The invention claimed is:

1. A method for producing renewable C3 hydrocarbons and renewable aromatic hydrocarbons from a renewable feedstock selected from animal oils, animal fats, plant oils, vegetable oils, microbial oils, and mixtures thereof, the method comprising the following steps:
   a) pre-treating the renewable feedstock by reducing the amount of impurities therein not to include: more than 10 w-ppm alkali metal and alkaline earth metal impurities, calculated as elemental alkali metals and alkaline earth metals; more than 10 w-ppm other metals, calculated as elemental metals; more than 1000 w-ppm nitrogen containing impurities, calculated as elemental nitrogen; more than 30 w-ppm phosphorus containing impurities, calculated as elemental phosphorus; more than 5 w-ppm silicon containing impurities, calculated as elemental silicon; to produce a pre-treated feedstock,
   b) subjecting the pre-treated feedstock to hydrodeoxygenation reaction to produce a hydrodeoxygenated stream, wherein the hydrodeoxygenation reaction comprise one or more of:
      a. a temperature in the range from 250° C. to 400° C.,
      b. a pressure in the range from 10 bar to 200 bar,
      c. a WHSV in the range from 0.25 h$^{-1}$ to 3 h$^{-1}$,
      d. a H$_2$ flow of 350 to 1500 N-L H$_2$/L feed, and
      e. a hydrodeoxygenation catalyst selected from Pd, Pt, Ni, Co, Mo, Ru, Rh, and W or any combination thereof, on a support,
   c) subjecting the hydrodeoxygenated stream to a gas-liquid separation to produce a gaseous stream and a hydrodeoxygenated liquid stream,
   d) subjecting the hydrodeoxygenated liquid stream to catalytic cracking conditions comprising
      i. a temperature in a range from 300° C. to 700° C.,
      ii. a residence time from 0.2 s to 7200 s, and
      iii. a catalyst comprising a zeolite and a support, wherein the zeolite is ZSM-12 with a pore size below 0.7 nm and at least one property selected from the group consisting of:
         an aluminum content from 0.1 wt-% to 1.5 wt;
         a BET surface area from 200 m²/g to 380 m²/g, determined by nitrogen physisorption;
         the ratio of the Brønsted acid sites to the Lewis acid sites is 1.7-4 determined by pyridine FT-IR;
         acidity from 180 umol/g to 500 umol/g, determined by NH$_3$-TPD method wherein acidity is calculated from the amount of NH$_3$ absorbed at 200° C. and desorbed between 100° C. and 500° C.,
      to produce a catalytically cracked stream, and subsequently
   e) separating the catalytically cracked stream at least to
      i) a fraction comprising the renewable C3 hydrocarbons, and ii) a fraction comprising the renewable aromatic hydrocarbons.

2. The method according to claim 1, wherein in step b) temperature is from 260° C. to 380° C. pressure is from 20 bar to 100 bar a weight hourly space velocity (WHSV) is in the range from 0.5 $h^{-1}$ to 3.0 $h^{-1}$, and $H_2$ flow is in the range from 350 to 1100 N-L $H_2$/L feed.

3. The method according to claim 1, wherein the catalytic cracking reaction of step e) is performed without any added hydrogen.

4. The method according to claim 1, wherein the catalytic cracking reaction of step e) is performed in the presence of an inert gas.

5. The method according to claim 1, wherein the catalytic cracking reaction of step e) comprises pressure from 1 bar to 40 bar.

6. The method according to claim 1, wherein the zeolite of step d) has an aluminium content from 0.6 wt-% to 1.3 wt-%.

7. The method according to claim 1, wherein the zeolite of step d) has a BET surface area from 250 $m^2$/g to 350 $m^2$/g, determined by nitrogen physisorption.

8. The method according to claim 1, wherein the catalytic cracking reaction of step d) comprise a temperature from 330° C. to 550° C. and a residence time from 2 min to 2 h.

9. The method according to claim 1, wherein the catalytic cracking reaction of step d) comprise temperature from 450° C. to 700° C. and a residence time from 0.2 s to 10 s.

10. The method according to claim 1, wherein the catalytic cracking reaction of step d) comprise temperature from 300° C. to 550° C. and a residence time from 30 min to 2 h.

11. The method according to claim 1, wherein the feedstock is selected from waste and residues of animal fat or oil, plant fat or oil, and fish fat or oil, and mixtures thereof.

12. The method according to claim 1, wherein the feedstock comprises triglycerides and/or free fatty acids.

13. The method according to claim 1, wherein the aromatic hydrocarbons are selected from a group consisting of benzene, toluene, ethyl benzene, m-xylene, p-xylene, o-xylene, and naphthalene.

14. The method according to claim 1, wherein the hydrodeoxygenated stream comprises at least 90 wt-% of paraffins.

15. The method according to claim 1, wherein the catalytic cracking conditions of step d) comprise a temperature in a range from 330° C. to 500° C.

16. The method according to claim 1, wherein in step c) temperature is from 280° C. to 350° C.

17. The method according to claim 1, wherein in step c) pressure is from 20 bar to 80 bar.

18. The method according to claim 1, wherein in step c) weight hourly space velocity (WHSV) is in the range from 0.7 $h^{-1}$ to 2.5 $h^{-1}$.

19. The method according to claim 1, wherein in step c) $H_2$ flow is in the range from 350 to 1000 N-L $H_2$/L feed.

20. The method according to claim 1, wherein the zeolite of step d) has an aluminum content from 0.6 wt-% to 1.3 wt-%.

21. The method according to claim 1, wherein the feedstock is selected from palm oil residues and wastes, tall oil material, used cooking oil, acid oils, animal fats, spent bleaching earth oil and technical corn oil.

* * * * *